United States Patent
Kasada et al.

(10) Patent No.: US 6,525,181 B2
(45) Date of Patent: Feb. 25, 2003

(54) CYANINE DYES

(75) Inventors: Chiaki Kasada, Okayama (JP); Katsumi Orita, Okayama (JP); Kentaro Yano, Okayama (JP); Toshio Kawata, Okayama (JP); Shigeo Yasui, Okayama (JP)

(73) Assignee: Kabushiki Kaisha Hayashibara Seibutsu Kagaku Kenkyujo, Okayama (JP)

( * ) Notice: Subject to any disclaimer, the term of this patent is extended or adjusted under 35 U.S.C. 154(b) by 0 days.

(21) Appl. No.: 09/959,300
(22) PCT Filed: Dec. 26, 2000
(86) PCT No.: PCT/JP00/09257
§ 371 (c)(1), (2), (4) Date: Oct. 23, 2001
(87) PCT Pub. No.: WO01/62853
PCT Pub. Date: Aug. 30, 2001

(65) Prior Publication Data
US 2002/0178517 A1 Dec. 5, 2002

(30) Foreign Application Priority Data
Feb. 23, 2000 (JP) .......................................... 2000-046570

(51) Int. Cl.[7] .......................... C09B 23/06; B41M 5/26; G11B 7/24
(52) U.S. Cl. .................. 534/707; 544/345; 430/270.18; 430/270.2
(58) Field of Search .......................... 534/707; 544/345; 430/270.18, 270.2

(56) References Cited

U.S. PATENT DOCUMENTS 3,431,111 A * 3/1969 Brooker et al. .............. 430/580
6,242,067 B1 * 6/2001 Kambe et al. ............. 428/64.1

FOREIGN PATENT DOCUMENTS

| EP | 1 103 547 A1 | 5/2001 |
| JP | 10-316655 | 2/1998 |
| JP | 2000-344750 | 12/2000 |
| WO | WO00/75111 A1 | 12/2000 |

* cited by examiner

Primary Examiner—Flona T. Powers
(74) Attorney, Agent, or Firm—Browdy and Neimark

(57) ABSTRACT

The object of the present invention is to provide organic dye compounds which exert satisfactory optical absorption properties and thermal resistance when used in high density optical recording media. The above object is solved by specific trimethine cyanine dyes, light absorbents and optical recording media which comprise the cyanine dyes, and preparations for the cyanine dyes comprising either reacting a benzoindolium compound having a compatible leaving group with a pyrazinoimidazolium compound having a reactive methyl group; or reacting a benzoindolium compound having a reactive methyl group with a pyrazinoimidazolium compound having a compatible leaving group.

16 Claims, 2 Drawing Sheets

CYANINE DYES

REFERENCE TO RELATED APPLICATIONS

The present application is the national stage under 35 U.S.C. §371 of international application PCT/JP00/09257, filed Dec. 26, 2000 which designated the United States, a n d which application was not published in the English language.

TECHNICAL FIELD

The present invention relates to novel organic dye compounds, particularly, to trimethine cyanine dyes-which are useful in high density optical recording media.

BACKGROUND ART

In a multimedia age, optical recording media such as a compact disc recordable (CD-R, a write-once memory using compact disc); and a digital versatile disc (DVD-R, a write-once memory using digital video disc), are now of great importance. Optical recording media can be classified roughly into inorganic optical recording media which have recording layers composed of inorganic substances such as tellurium, selenium, rhodium, carbon, or carbon sulfide; and organic optical recording media which have recording layers composed of light absorbents that are mainly composed of organic dye compounds.

Among these optical recording media, organic optical recording media are usually prepared by dissolving a polymethine cyanine dye in an organic solvent such as 2,2,3,3-tetrafluoro-1-propanol (abbreviated as "TFP" hereinafter), coating the solution onto the surface of a polycarbonate substrate, drying the solution to form a recording layer, and sequentially attaching closely a reflection layer made of a metal such as gold, silver or copper and a protective layer made of an ultraviolet ray hardening resin onto the surface of the recording layer. When compared with inorganic optical recording media, organic ones have the drawback that their recording layers may be easily changed by exposure to light such as reading and natural light, but have the advantage that they can be manufactured at a lower cost because their recording layers can be formed by preparing solutions of light absorbents and directly coating the solutions onto the surface of substrates. Also, organic optical recording media are now becoming the predominant low cost optical recording media because of the advantages that they are mainly composed of organic substances so that they are substantially free of corrosion even when contacted with moisture or sea water; and because information, which is stored in optical recording media in a prescribed format, can be read out using commercialized read-only players using thermal-deformation-type optical recording media, a kind of organic optical recording media.

What is urgently required of organic optical recording media is to increase their recording capacity to suit this multimedia age. The research for such an increment now eagerly continued in this field is to shorten the wavelength of 775–795 nm now used as a writing light to the wavelength of 700 nm or less. However, most of the polymethine cyanine dyes, which had been explored for CD-Rs, could not suitably read and write information using laser beams with wavelengths of 700 nm or less, and therefore they could not fulfill the need for high storage density required in many fields.

There exists a problem of the thermal decomposition of dyes as another causative of hindering the high storage density in organic optical recording media. In organic optical recording media, pits are formed by using the heat, generated when dyes absorb laser beams, to be melted and decomposed, however, most of conventional polymethine cyanine dyes have relatively high decomposition points independently apart from their melting points, and the temperature difference between the melting points and decomposition points; and thus, the formation of pits becomes rough when irradiated with laser beams, and the decomposition heat conducts to around the irradiated points and deforms the already formed adjacent pits, resulting in a difficulty of stably forming minute pits on restricted sites at a relatively high density.

In view of the foregoing, the object of the present invention is to provide organic dye compounds having satisfactory properties in light absorption and thermal resistance.

SUMMARY OF THE INVENTION

To attain the above object, the present inventors eagerly studied and screened compounds and found that specific trimethine cyanine dyes (hereinaftermaybe abbreviatedas "cyanine dyes"), which are obtainable through a step of reacting a benzoindolium compound having a compatible leaving group with a pyrazinoimidazolium compound having an active methyl group; or reacting a benzoindolium compound having an active methyl group with a pyrazinoimidazolium compound having a compatible leaving group, have absorption maxima in a visible region and substantially absorb visible light with wavelengths around 650 nm when in a thin layer form, and have a relatively high decomposition points and thermal resistance. The present inventors also confirmed that these cyanine dyes stably form minute pits on the recording layers at a relatively high density when used in optical recording media and irradiated with laser beams with wavelengths around 650 nm. The present invention was made based on the creation of the novel organic dye compounds and the discovery of their industrially useful characteristics.

BRIEF EXPLANATION OF THE ACCOMPANYING DRAWINGS

BEST MODE OF THE INVENTION

Figure 1:
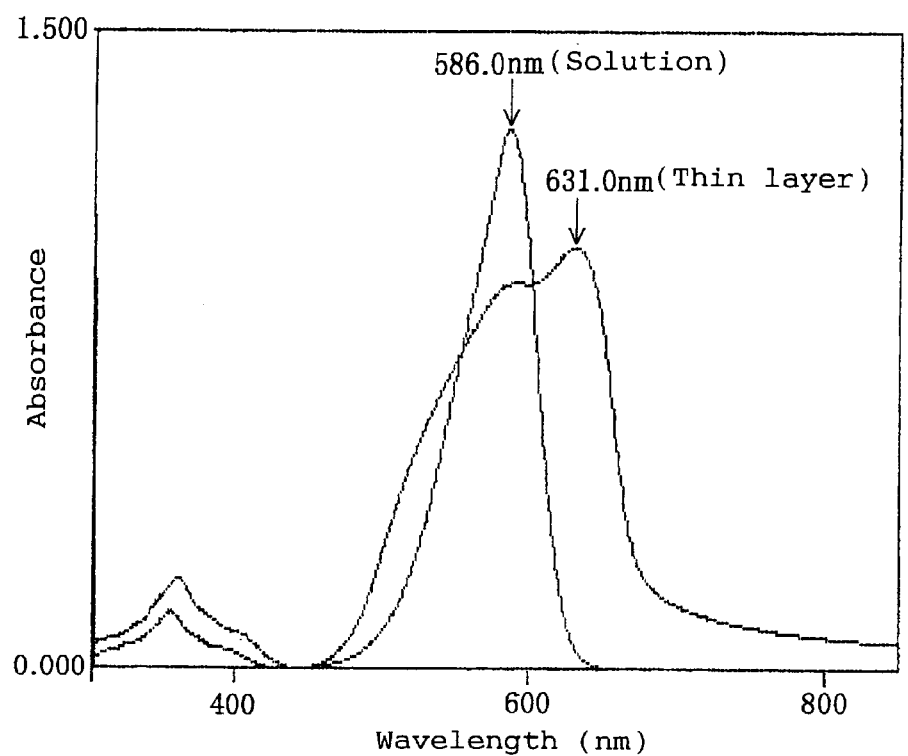
FIG. 1 shows the visible absorption spectra of one of the cyanine dyes of the present invention when in a solution form and in a thin layer form.

The present invention solves the above object by providing the cyanine dyes represented by the Formula 1.

Formula 1:

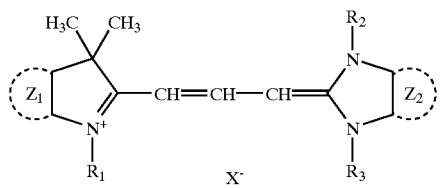

In Formula 1, $R_1$, $R_2$ and $R_3$ are the same or different aliphatic hydrocarbon groups, for example, those which usually have up to eight carbon atoms such as methyl, ethyl, propyl, isopropyl, 1-propenyl, 2-propenyl (allyl), isopropenyl, butyl, isobutyl, sec-butyl, tert-butyl, 2-butenyl, 1,3-butadienyl, pentyl, isopentyl, neopentyl, tert-pentyl, 1-methylpentyl, 2-methylpentyl, 2-pentenyl, hexyl, isohexyl, 5-methylhexyl, heptyl, and octyl groups, which may have one or more substituents, for example, halogens such as fluorine, chlorine, bromine, and iodine; ether groups such as methoxy, trifluoromethoxy, ethoxy, propoxy, isopropoxy, butoxy, tert-butoxy, phenoxy, benzyloxy, and naphthoxy groups; ester groups such as methoxycarbonyl, ethoxycarbonyl, propoxycarbonyl, acetoxy, trifluoroacetoxy, and benzoyloxy groups; aromatic hydrocarbon groups such as phenyl, trifluoromethoxy, o-tolyl, m-tolyl, p-tolyl, xylyl, mesityl, naphthyl, o-cumenyl, m-cumenyl, and p-cumenyl groups; heterocyclic groups such as pyridyl, furyl, thienyl, and pyranyl groups; and other groups such as hydroxy, carboxy, nitro, and cyano groups.

In Formula 1, $Z_1$ and $Z_2$ each represents a condensed naphthalene ring or a condensed quinoxaline ring for forming a benzoindolenine ring and a pyrazinoimidazole ring, respectively. Either or both of the condensed naphthalene ring and the condensed quinoxaline ring may have one or more substituents including aliphatic hydrocarbons and halogen-substituted aliphatic hydrocarbons such as methyl, trifluoromethyl, ethyl, propyl, isopropyl, butyl, isobutyl, sec-butyl, and tert-butyl groups; halogens such as fluorine, chlorine, bromine, and iodine; ether groups such as methoxy, trifluoromethoxy, ethoxy, propoxy, isopropoxy, butoxy, and tert-butoxy groups; ester groups such as methoxycarbonyl, trifluoromethoxycarbonyl, ethoxycarbonyl, propoxycarbonyl, phenoxycarbonyl, acetoxy, trifluoroacetoxy, and benzoyloxy groups; amino groups such as methyl amino, dimethyl amino, ethyl amino, diethyl amino, piperidino, anilino, o-toluidino, m-toluidino, and p-toluidino groups; amido groups such as acetamide and benzamide groups; and others such as hydroxy, carbonyl, nitro, and cyano groups.

In Formula 1, $X^-$ represents a counter ion. Although the counter ion is not specifically restricted and varied depending on use, it can be appropriately selected in view of the solubility of the cyanine dyes in each organic solvent used and the stability of the dyes in a glass state. Examples of such are fluoric acid, chloric acid, bromic acid, iodic acid, phosphoric acid, perchloric acid, periodic acid, phosphoric acid hexafluoride, antimony acid hexafluoride, tin acid hexafluoride, fluoroboric acid, and tetrafluoroborate ions; organic acid anions such as thiocyanic acid, benzenesulfonic acid, naphthalenesulfonic acid, p-toluenesulfonic acid, benzenecarboxylic acid, alkylcarboxylic acid, trihaloalkylsulfonic acid, alkylsulfonic acid, trihaloalkylsulfonic acid, and nicotinic acid ions; and metal complex anions such as those of azo, bisphenyldithiol, thiocatecholchelate, thiobisphenolatechelate, bisdiol-α-diketone, and their related compounds. In the cyanine dyes represented by Formula 1, structurally different cis trans isomers thereof, if exist, are all included in the present invention.

Concrete examples of the cyanine dyes of the present invention are those which are represented by Formulae 1 to 27 having the following characteristic features that they have absorption maxima in a visible region, substantially absorb visible light with wavelengths around 650 nm when in a thin layer form, and have a relatively high decomposition point and thermal resistance. Thus, the above cyanine dyes can be advantageously used as light absorbents in optical recording media which use laser beams with wavelengths of around 650 nm when in a thin layer form, particularly, in high density optical recording media such as DVD-Rs which use laser beams with wavelengths of 635–660 nm as a writing light.

Formula 1:

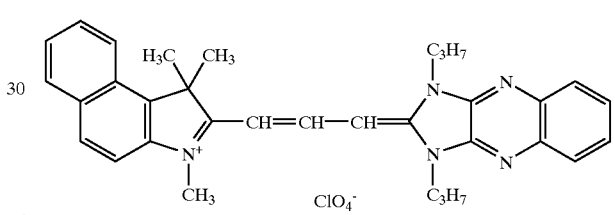

Formula 2:

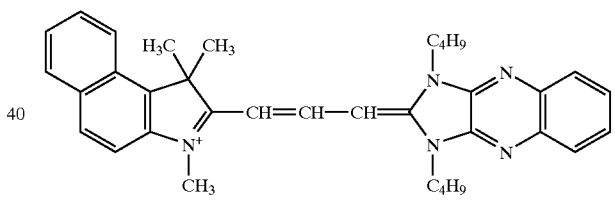

Formula 3:

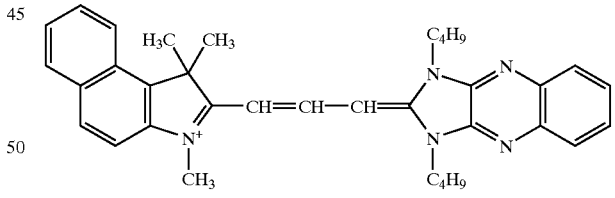

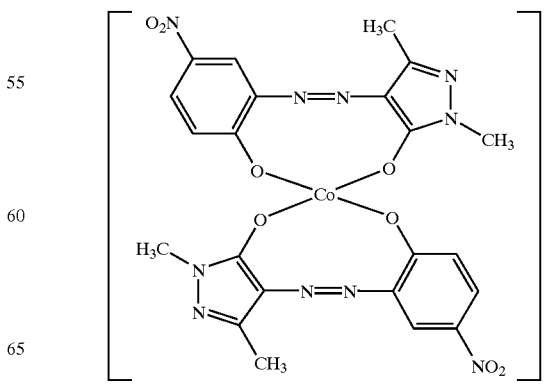

-continued
Formula 4:
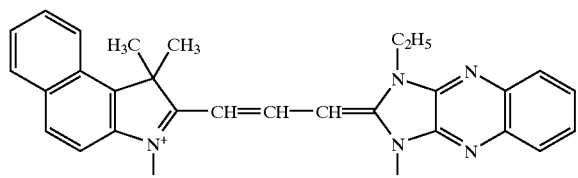
Formula 5:
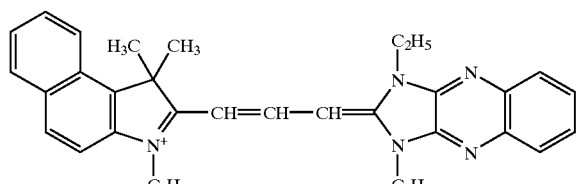
Formula 6:
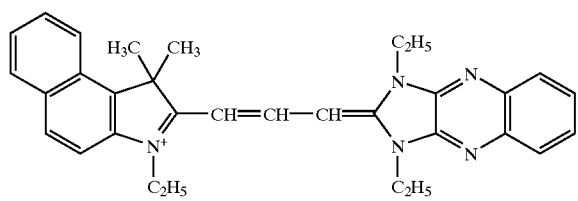
Formula 7:
Formula 8:
Formula 9:
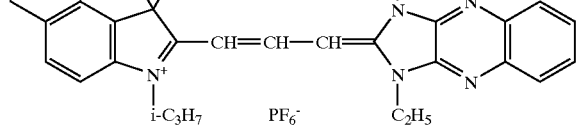
-continued
Formula 10:
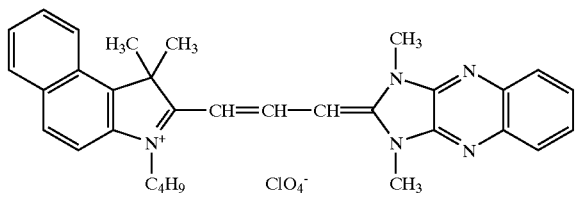
Formula 11:
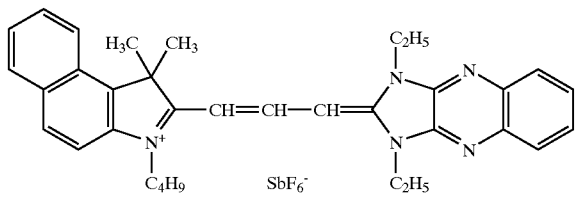
Formula 12:
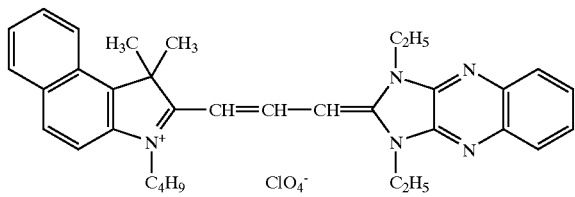
Formula 13:
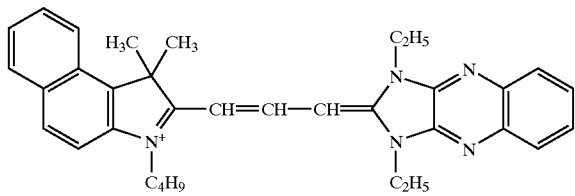
Formula 14:
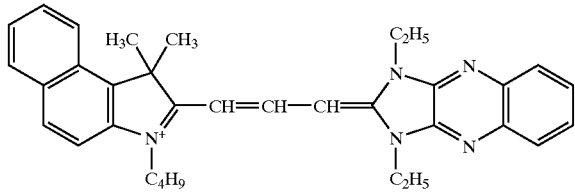
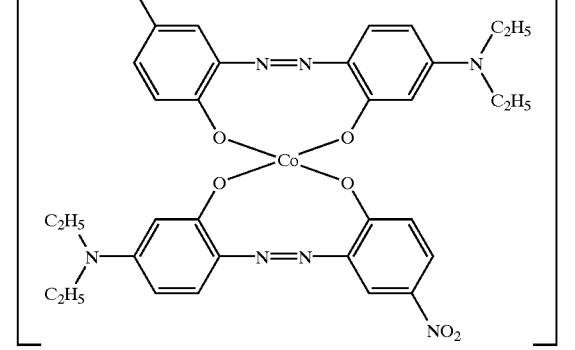
Formula 15:
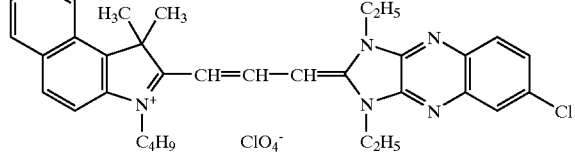

Formula 16:
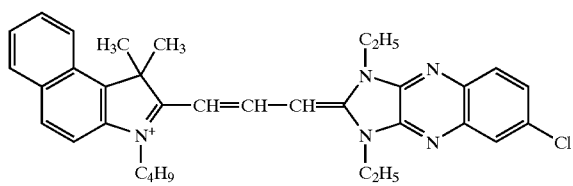
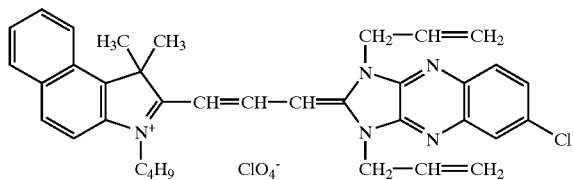
Formula 17:
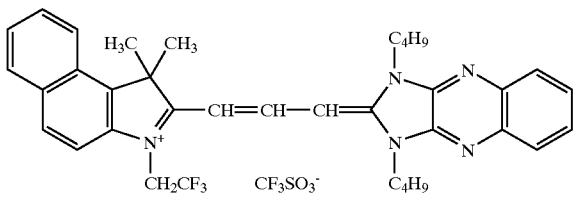
Formula 18:
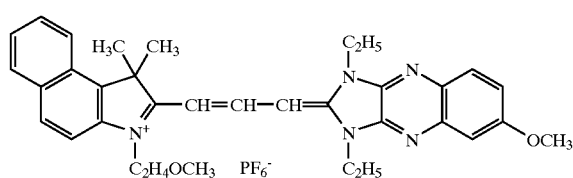
Formula 19:
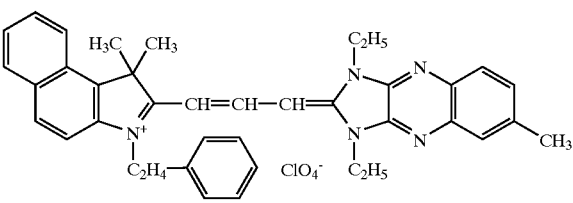
Formula 20:
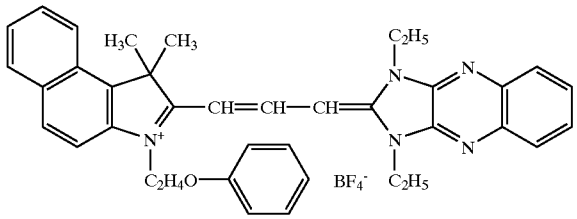
Formula 21:
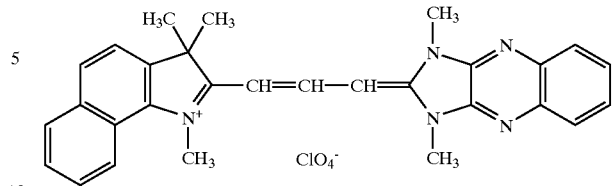
Formula 22:
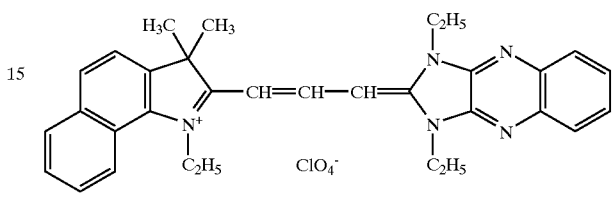
Formula 23:
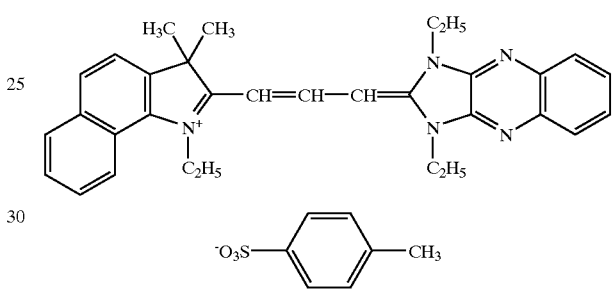
Formula 24:
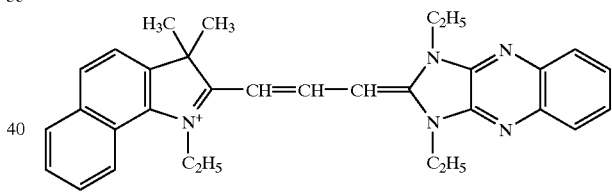
Formula 25:
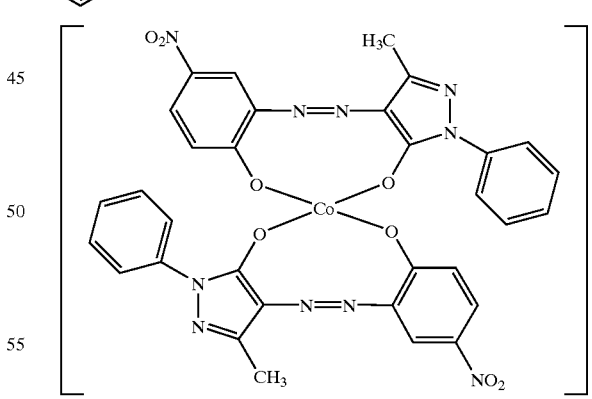
Formula 26:
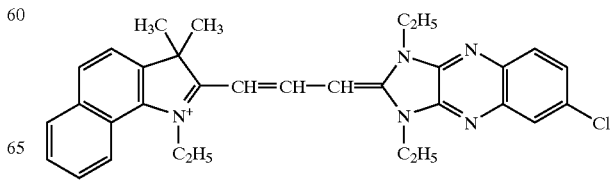

-continued

Formula 27:

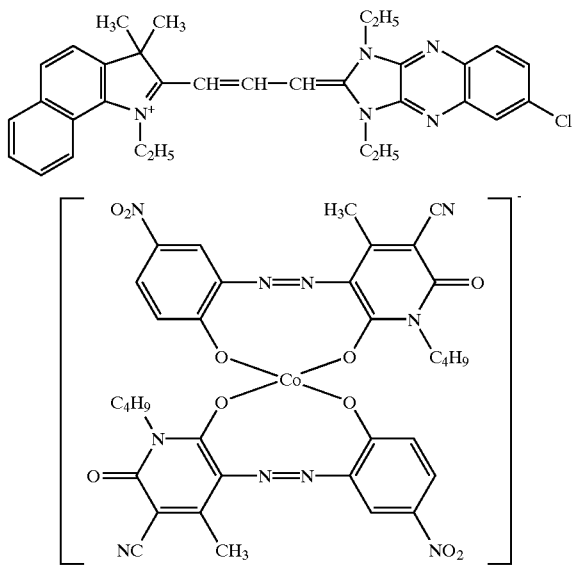

The cyanine dyes of the present invention can be prepared by various methods. When the production cost is weighed, the cyanine dyes can be preferably prepared through a step of either reacting a benzoindolium compound having a compatible leaving group with a pyrazinoimidazolium compound having a reactive methyl group; or reacting a benzoindolium compound having a reactive methyl group with a pyrazinoimidazolium compound having a compatible leaving group. According to this method, the cyanine dyes of the present invention can be produced in a satisfactorily high yield by either reacting the compounds, represented by Formula 2 having $R_1$ and $Z_1$ corresponding to Formula 1, with the compounds represented by Formula 3 having $R_2$, $R_3$ and $Z_2$ corresponding to Formula 1; or reacting the compounds, represented by Formula 4 having $R_1$ and $Z_1$ corresponding to Formula 1, with the compounds represented by Formula 5 having $R_2$, $R_3$ and $Z_2$ corresponding to Formula 1.

Formula 2:

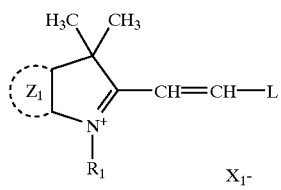

Formula 3:

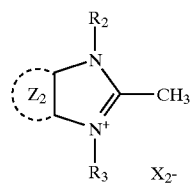

-continued

Formula 4:

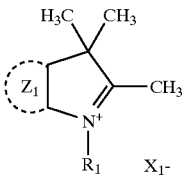

Formula 5:

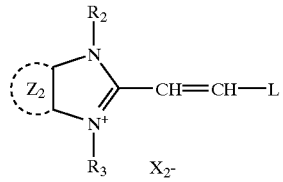

For example, adequate amounts (usually, about equimolar) of the compounds represented by Formulae 2 and 3 or the compounds represented by Formulae 4 and 5 are dissolved in an appropriate solvent and reacted at ambient temperature or at a higher temperature under heating and stirring conditions, for example, by heat refluxing, optionally after admixed with an adequate amount of a basic compound(s) such as sodium hydroxide, potassium hydroxide, sodium acetate, potassium acetate, sodium carbonate, potassium carbonate, calcium carbonate, sodium bicarbonate, potassium bicarbonate, ammonia, triethylamine, N,N-dimethylaniline, N,N-diethylaniline, N-dimethyl pyrrolidone, piperidine, morpholine, pyridine, and 1,8-diazabicyclo[5.4.0]-7-undecene; an acid compound (s) such as hydrochloric acid, sulfuric acid, nitric acid, methane sulfonic acid, p-toluenesulfonic acid, acetic acid, anhydrous acetic acid, anhydrous propionic acid, trifluoroacetic acid, and trif luorosulfonic acid; or a Lewis acid compound(s) such as aluminum chloride, zinc chloride, tin tetrachloride, and titanium tetrachloride.

Examples of the solvents used in the present invention include hydrocarbons such as pentane, hexane, cyclohexane, octane, benzene, toluene, and xylene; halogen compounds such as carbon tetrachloride, chloroform, 1,2-dichloroethane, 1,2-dibromoethane, trichloroethylene, tetrachloroethylene, chlorobenzene, bromobenzene, and α-dichlorobenzene; alcohols and phenols such as methanol, ethanol, 1-propanol, 2-propanol, 1-butanol, 2-butanol, isobutyl alcohol, isopentyl alcohol, cyclohexanol, ethylene glycol, propylene glycol, 2-methoxyethanol, 2-ethoxyethanol, phenol, benzyl alcohol, cresol, diethylene glycol, triethylene glycol, and glycerine; ethers such as diethyl ether, diisopropyl ether, tetrahydrofuran, tetrahydropyran, 1,4-dioxane, anisole, 1,2-dimethoxyethane, diethylene glycol dimethyl ether, dicyclohexyl-18-crown-6, methyl carbitol, ethylcarbitol, methyl cellosolve, and ethyl cellosolve; ketones such as furfural, acetone, ethyl methyl ketone, and cyclohexanone; acids and derivatives thereof such as acetic acid, anhydrous acetic acid, anhydrous propionic acid, trichloroacetic acid, trifluoroacetic acid, anhydrous propionic acid, ethyl acetate, butyl carbonate, ethylene carbonate, propylene carbonate, formamide, N-methyl formamide, N,N-dimethylformamide, N-methylpyrrolidone, N-methylacetamide, N,N-dimethylacetamide, hexamethylphosphoric triamide, and trimethyl phosphate; nitriles such as acetonitrile, propionitrile, succinonitrile, and benzonitrile; nitro compounds such as nitromethane and nitrobenzene; sulfur atom-containing compounds such as dimethylsulfoxide and sulfolane; and water, which all can be used in an appropriate combination, if necessary.

In the case of using the above solvents, the greater the volume of solvents the lower the reaction efficiency becomes. On the contrary, the lower the volume of solvents, the more difficult the homogenous heating and stirring become, and the more undesirable side-reactions may easily occur. Thus, the solvents should preferably be used in an amount up to 100 times by weight of the material reactants used, usually, it is preferably used in the range of 5–50 times. Depending on the types of the material compounds and the reaction conditions used, the reaction should preferably be terminated within 10 hours, usually, within 0.5–5 hours. The reaction procedure can be monitored by conventional methods such as thin layer chromatography, gas chromatography, and high-performance liquid chromatography. After completion of the reaction, the intact reaction mixtures, if necessary, can be subjected to conventional counter-ion exchange reaction to obtain the cyanine dyes of the present invention having a desired counter ion. All the cyanine dyes represented by Formulae 1 to 27 can be easily obtained in a desired yield by the above methods. The benzoindolium compounds and the pyrazinoimidazolium compounds represented by Formulae 2 to 5 can be obtained by the method disclosed in Japanese Patent Kokai No. 316,655/98 applied for by the same applicant as the present invention or in accordance therewith. In Formulae 2 to 5, $X_1^-$ $^{and\, X}$ $_2^-$ are the same or different counter ions as those in Formula 1. L is a compatible leaving group and is usually selected from monovalent aniline groups such as anilino, p-toluidino, p-methoxyanilino, p-ethoxycarbonylanilino, and N-acetylanilino, and derivatives thereof.

The cyanine dyes thus obtained can be used in the form of an intact reaction mixture for some uses, however, prior to use, they are purified by conventional methods used for purifying the related compounds such as dissolution, extraction, separation, decantation, filtration, concentration, thin layer chromatography, column chromatography, gas chromatography, high-performance liquid chromatography, distillation, crystallization, and sublimation. If necessary, these methods can be used in an appropriate combination. For use as light absorbents in high density optical recording media such as DVD-Rs and dye lasers, the cyanine dyes of the present invention should preferably be purified by the methods such as distillation, crystallization and/or sublimation, prior to use.

Now explaining the uses of the cyanine dyes of the present invention, as already described above, the cyanine dyes have absorption maxima in a visible region, substantially absorb visible light with wavelengths around 650 nm when in a thin layer form, and have a relatively high decomposition point and thermal resistance. In addition, most of the cyanine dyes have only decomposition points, i.e., temperatures at which the cyanine dyes used as testing samples start to reduce their weights when determined on the later described thermogravimetric analysis, undistinguishable from their melting points, i.e., the temperatures at which the cyanine dyes as testing samples start to absorb heat when determined on the later described differential thermal analysis, where the temperature difference between a melting point and a decomposition point is within 10° C.; and promptly decompose at around their decomposition points. Thus, the cyanine dyes of the present invention have a variety of uses in the fields of optical recording media, photochemical polymerization, solar batteries, dyeing, etc., which require the organic dye compounds having such a relatively high decomposition point and thermal resistance. Particularly, the cyanine dyes of the present invention having the above properties can be advantageously used as light absorbents sensitive to laser beams with wavelengths around 650 nm in high density optical recording media such as DVD-Rs.

The cyanine dyes of the present invention for use in the optical recording media according to the present invention can be prepared in accordance with the preparation methods for conventional optical recording media because the cyanine dyes do not require any special treatment and handling when used in optical recording media. For example, to control the reflectance and the absorptance in recording layers, one or more of the cyanine dyes of the present invention as light absorbents can be, if necessary, incorporated with one or more other organic dye compounds sensitive to visible light and further, to improve the processibility and ability of the optical recording media, one or more conventionally used light resistant improvers, binders, dispersants, flame retardants, lubricants, antistatic agents, surfactants, and plasticizers. The resulting mixtures are then dissolved in organic solvents, and the solutions are homogeneously coated over either surface of substrates by spraying, soaking, roller coating, or rotary coating method; and dried to form thin layers as recording layers made of light absorbents and, if necessary, followed by forming reflection layers to be closely attached on the recording layers by means of vacuum deposition, chemical vapor deposition, sputtering, or ion-planting method using metals such as gold, silver, copper, platinum, aluminum, cobalt, tin, nickel, iron, and chromium or using commonly used materials for organic reflection layers to attain a reflection efficiency of 45% or higher, preferably, 55% or higher. Alternatively, to protect the recording layers from scratches, dust, stains, etc., coatings may be applied over the recording layers with ultraviolet ray hardening resins or thermosetting resins which contain flame retardants, stabilizers, or antistatic agents, and then the coatings are hardened by irradiating light or heating to form protective layers attached closely over the reflection layers. Thereafter, if necessary, a pair of the above substrates with recording-, reflection-, and protecting-layers are placed while facing the protective layers each other and attached together using, for example, adhesives or viscous sheets; or protective plates, which are made of similar materials and shapes as in the substrates, are attached to the protective layers.

Other organic dye compounds used in combination with the cyanine dyes of the present invention are not specifically restricted as long as they are sensitive to visible light and capable of controlling the reflectance or the absorptance of recording layers of optical recording media when used in combination with the cyanine dyes. Examples of such organic dye compounds are polymethine dyes such as styryl, merocyanine, oxonol, azulenium, squallilium, pyrylium, thiopyrylium, and phenanthrene dyes, which have either a monomethine chain that may have one or more substituents or a polymethine chain such as di-, tri-, tetra-, penta-, hexa-, and hepta-methine-chains, wherein the both ends of the monomethine chain or the polymethine chain bind the same or different cyclic cores such as imidazoline, imidazole, benzimidazole, α-naphthoimidazole, β-naphthoimidazole, indole, isoindole, indolenine, isoindolenine, benzindolenine, pyridinoindolenine, oxazoline, oxazole, isoxazole, benzoxazole, pyridineoxazole, α-naphthoxazole, β-naphthoxazole, selenazoline, selenazole, benzoselenazole, α-naphthoselenazole, β-naphthoselenazole, thiazoline, thiazole, isothiazole, benzothiazole, α-naphthothiazole, β-naphthothiazole, tellulazoline, tellulazole, benzotellulazole, α-naphthotellulazole, β-naphthotellulazole, aquaridine, anthracene, isoquinoline, isopyrrole, imidaquinoxaline, indandione, indazole, indazoline, oxadiazole, carbazole, xanthene, quinazoline, quinoxaline, quinoline, chroman, cyclohexanedione, cyclopentanedione, cinnoline, thiodiazole, thiooxazolidone, thiophene, thionaphthene, thiobarbitur, thiohydantoin, tetrazole, triazine, naphthalene, naphthyridine, piperazine, pyrazine, pyrazole, pyrazoline, pyrozolone, pyran, pyridine, pyridazine, pyrimidine, pyrylium, pyrrolidine, pyrroline, pyrrole, phenazine, phenanthridine, phenanthrene, phenanthroline, phthalazine, pteridine, furazan, furan, purine, benzene, benzoxazine, benzopyran, morpholine, and rhodaninerings, whichmayhaveoneormoresubstituents. In addition, the following organic dye compounds can be exemplified; acridine, thioindigo, tetrapyraporphyradine, triphenylmethine, triphenylthiazine, napthoquinone, phthalocyanine, benzoquinone, benzopyran, benzofuranone, porphyrin, rhodamine dyes, and their related compounds. Depending on use, the above organic dye compounds can be used in an appropriate combination. Preferable organic dye compounds used in combination with the cyanine dyes of the present invention are those which have absorption maxima in a visible region, particularly, those at wavelengths of 400–850 nm, when in a thin layer form.

The light-resistant improvers used in the present invention are, for example, nitroso compounds such as nitrosodiphenylamine, nitrosoaniline, nitrosophenol, and nitrosonaphthol; and metal complexes such as tetracyanoquinodimethane compounds, diimmonium salts, "NKX-1199" (bis[2'-chloro-3-methoxy-4-(2-methoxyethoxy) dithiobenzyl]nickel) produced by Hayashibara Biochemical Laboratories, Inc., Okayama, Japan, azo dye metal complexes, and formazan complexes, which all can be used in an appropriate combination, if necessary. Preferable light resistant improvers are those which contain nitroso compounds or formazan metal complexes; nitroso compounds having a phenylpyridylamine skeleton as disclosed in Japanese Patent Application No. 88,983/99, titled "Phenylpyridylamine derivatives" applied for by the same applicant as the present invention, and those which contain metal complexes composed of metals such as nickel, zinc, cobalt, iron, copper, palladium, etc., and, as ligands, one or more of the formazan compounds and their tautomers, which have a pyridine ring at C-5 of the formazan skeleton and have a pyridine or furan ring bound to C-3 of the formazan skeleton as disclosed in Japanese Patent Application No. 163,036/99, titled "Formazane metal complex" applied for by the same applicant as the present invention. The combination use of the light resistant improvers and the cyanine dyes of the present invention effectively inhibits the undesirable deterioration, fading, color change, and quality change of the cyanine dyes, which are inducible by the exposure of reading and environmental light, without lowering the solubility of the cyanine dyes in organic solvents and substantially spoiling their preferable optical properties. As for the composition ratio, 0.01–5 moles, preferably, 0.1–1 mole of a light resistant improver(s) can be incorporated into one mole of the present cyanine dye(s) while increasing or decreasing the ratio.

The light resistant improvers should not necessarily exist separatory from the cyanine dyes of the present invention and, if necessary, the cyanine dyes can be formulated into salts, complexes, or compounds by combining with commonly used organic metal complex anions, which are capable of improving the light resistance, such as those of azo, bisphenyldithiol, phenylbisdiol, thiocatecholchelate, thiobisphenolatechelate, or bisdithiol-α-diketone, by using appropriate spacers and crosslinking agents, for example, alkoxides or cyanates of metal elements such as titanium, zirconium, and aluminum; or using complexes of these metal elements having carbonyl compounds or hydroxy compounds as ligands. Azo organic metal complex anions are preferably used in the present invention and examples of which are those represented by Formulae 6 to 10.

Formula 6:

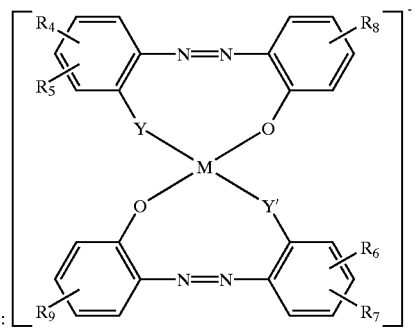

Formula 7:

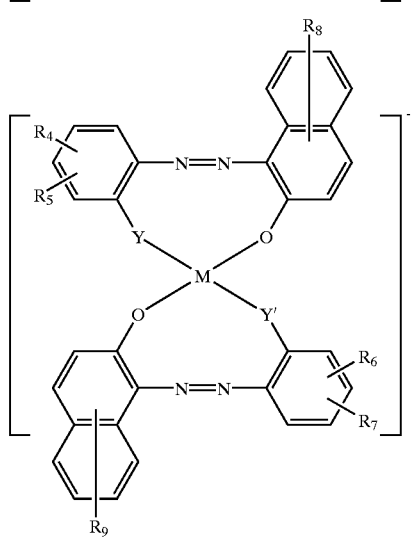

Formula 8:

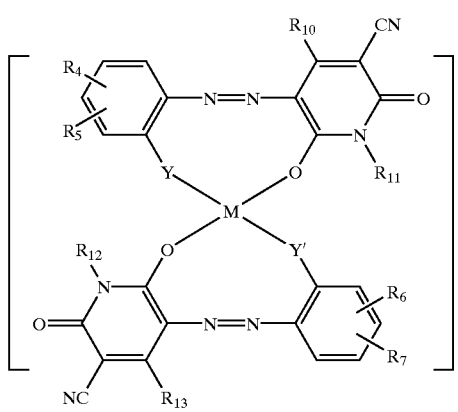

Formula 9:

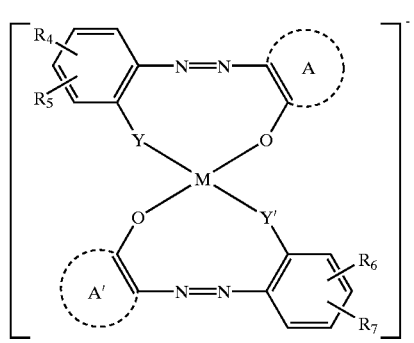

Formula 10:

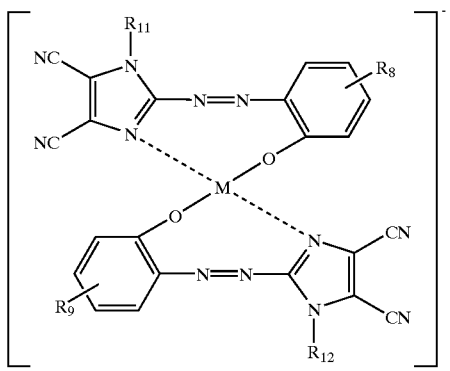

Throughout Formulae 6 to 9, $R_4$ to $R_7$ independently denote hydrogen atoms; halogens such as fluorine, chlorine, bromine, and iodine; aliphatic hydrocarbons such as methyl, trifluoromethyl, ethyl, propyl, isopropyl, butyl, isobutyl, sec-butyl, tert-butyl, 1-methylbutyl, 2-methylbutyl, 3-methylbutyl, pentyl, isopentyl, neopentyl, tert-pentyl, hexyl, and isohexyl groups; ether groups such as methoxy, trifluoromethoxy, ethoxy, propoxy, isopropoxy, butoxy, and tert-butoxy groups; ester groups such as methoxycarbonyl, phenoxycarbonyl, acetoxy, trifluoroacetoxy, and benzoyloxy groups; alkylaminosulfonyl groups such as methylaminosulfonyl, dimethylaminosulfonyl, ethylaminosulfonyl, diethylaminosulfonyl, propylaminosulfonyl, and isopropylaminosulfonyl; or others such as cyano and nitro groups. Y and Y' are, for example, the same or different hetero atoms selected from the 16 group in the periodic table such as oxygen, sulfur, selenium, and tellurium. In Formulae 6 to 10, M is a central metal and is generally, for example, one selected from metal elements from the 3–12 groups in the periodic table such as scandium, yttrium, titanium, zirconium, vanadium, niobium, chrome, molybdenum, manganese, technetium, iron, rubidium, cobalt, rhenium, nickel, palladium, copper, silver, zinc, and cadmium.

Throughout Formula 6 and Formulae 7 to 10, $R_8$ and $R_9$ each independently denotes a hydrogen atom or, for example, a halogen such as fluorine, chlorine, bromine, or iodine; an aliphatic hydrocarbon group such as methyl, ethyl, propyl, isopropyl, butyl, or tert-butyl group; an ether group such as methoxy, trifluoromethoxy, ethoxy, propoxy, isopropoxy, butoxy or tert-butoxy group; a substituted or unsubstituted aliphatic, alicyclic or aromatic amino group, for example, a monomethylamino, dimethylamino, monoethylamino, diethylamino, monopropylamino, dipropylamino, monoisopropylamino, diisopropylamino, monobutylamino, dibutylamino, anilino, o-toluidino, m-toluidino, p-toluidino, xylidino, pyridylamino, piperidinyl, piperidino, orpyrrolidinogroup; orahydroxy, carboxy, carbamoyl, sulfo, or sulfonamide group. One or more of the hydrogen atoms of these substituted amino, carbamoyl, sulfo, and sulfonamide groups may be replaced with halogens such as fluorine, chlorine, bromine, and iodine; aliphatic hydrocarbons such as methyl, ethyl, propyl, and butyl groups; ethers such as methoxy, trifluoromethoxy, ethoxy, and propoxy groups; aromatic hydrocarbon groups such as phenyl, biphenyl, o-tolyl, m-tolyl, p-tolyl, o-cumenyl, m-cumenyl, p-cumenyl, xylyl, and mesityl groups; or other substituents such as carboxy, hydroxy, cyano, and nitro groups.

Throughout Formulae 8 and 10, $R_{10}$ to $R_{13}$ each independently denotes a hydrogen atom or other groups, for example, aliphatic hydrocarbons such as methyl, ethyl, propyl, isopropyl, butyl, isobutyl, sec-butyl, tert-butyl, 1-methylbutyl, 2-methylbutyl, 3-methylbutyl, pentyl, isopentyl, neopentyl, and tert-pentyl groups. These aliphatic hydrocarbons may contain one or more substituents, and examples of such substituents are halogens such as fluorine, chlorine, bromine, and iodine; ethers such as methoxy, trifluoromethoxy, ethoxy, propoxy, isopropoxy, butoxy, and tert-butoxy groups; aromatic hydrocarbon groups such as phenyl, biphenyl, o-tolyl, m-tolyl, p-tolyl, o-cumenyl, m-cumenyl, p-cumenyl, xylyl, mesityl, and naphthyl groups; and others such as carboxy, hydroxy, cyano, and nitro groups.

In Formula 9, A and A' are the same or different heterocyclic groups with a five to ten membered ring structure, for example, furyl, thienyl, pyrolyl, pyridyl, piperidinio, piperydil, quinolyl, isoxazolyl, thiazolynyl, and imidazolynyl groups, which contain one or more hetero atoms selected from nitrogen, oxygen, sulfur, selenium, and tellurium atoms. Examples of the heterocyclic groups may contain one or more substituents, for example, aliphatic hydrocarbons such as methyl, trifluoromethyl, ethyl, propyl, isopropyl, butyl, isobutyl, sec-butyl, tert-butyl, 1-methylbutyl, 2-methylbutyl, 3-methylbutyl, pentyl, isopentyl, neopentyl, and tert-pentyl groups; esters such as methoxycarbonyl, trifluoromethoxy, ethoxycarbonyl, acetoxy, trifluoroacetoxy, and benzoyloxy groups; aromatic hydrocarbon groups such as phenyl, biphenyl, o-tolyl, m-tolyl, p-tolyl, o-cumenyl, m-cumenyl, p-cumenyl, xylyl, mesityl, and naphthyl groups; and others such as cyano and nitro groups.

All the above-mentioned organic metal complex anions including azo metal complexes can be prepared by conventional methods or in accordance therewith. The cyanine dyes of the present invention, which comprise the above anions as counter ions, have in themselves light resistance and do not necessary require the combination use of other light resistant improvers as essential elements when used in high density optical recording media such as DVD-Rs. As a result, the cyanine dyes of the present invention can be freely coated on substrates for optical recording media without considering their solubility with light resistant improvers when in the form of a liquid or amorphous. Based on the same reason, the cyanine dyes of the present invention can be advantageously used not only as light absorbents for forming pits on substrates but as materials for improving light resistance of other light absorbents. Examples of the cyanine dyes of the present invention, which have organic metal complex ions as counter ions, include those represented by Chemical Formulae 3, 6, 14, 16, 25 and 27.

The cyanine dyes of the present invention have satisfactory solubility in organic solvents without substantially causing no actual problem and dot not substantially restrict organic solvents used for coating the cyanine dyes onto substrates. Thus, in the preparation of optical recording media according to the present invention, for example, TFP used frequently to prepare optical recording media and the following organic solvents other than TFP can be selected and appropriately used in combination: For example, hydrocarbons such as hexane, cyclohexane, methylcyclohexane, dimethylcyclohexane, ethylcyclohexane, isopropylcyclohexane, tert-butylcyclohexane, octane, cyclooctane, benzene, toluene, and xylene; halogen compounds such as carbon tetrachloride, chloroform, 1,2-dichloroethane, 1,2-dibromoethane, trichloroethylene, tetrachloroethylene, chlorobenzene, bromobenzene, and α-dichlorobenzene; alcohols and phenols such as methanol, ethanol, 2,2,2-trifluoroethanol, 1-propanol, 2-propanol, 1-methoxy-2-propanol, 1-ethoxy-2-propanol, 1-butanol, 1-methoxy-2-butanol, 3-methoxy-1-butanol, 4-methoxy-1-butanol, isobutyl alcohol, pentyl alcohol, isopentyl alcohol, cyclohexanol, 2-methoxyethanol (methyl cellosolve), 2-ethoxyethanol (ethyl cellosolve), 2-propoxy-1-ethanol, diethylene glycol, triethylene glycol, propylene glycol, glycerine, phenol, benzyl alcohol, cresol, and diacetone alcohol; ethers such as diethyl ether, diisopropyl ether, tetrahydrofuran, tetrahydropyran, 1,4-dioxane, anisole, 1,2-dimethoxyethane, diethylene glycol dimethyl ether, dicyclohexyl-18-crown-6, methyl carbinol, and ethylcarbitol; ketones such as furfural, acetone, ethyl methyl ketone, and cyclohexanone; esters such as ethyl acetate, butyl acetate, ethylene carbonate, propylene carbonate, and trimethyl phosphate; amides such as formamide, N-methyl formamide, N,N-dimethylformamide, and hexamethylphosphoric triamide; nitriles such as acetonitrile, propionitrile, and succinonitrile; nitro compounds such as nitromethane and nitrobenzene; amines such as ethylene diamine, pyridine, piperidine, morpholine, and N-methylpyrrolidone; and sulfur atom-containing compounds such as dimethylsulfoxide and sulfolane.

Particularly, since the cyanine dyes of the present invention have relatively high solubility in easily volatile organic solvents such as TFP, diacetone alcohol, methyl cellosolve, and ethyl cellosolve, they are substantially free from dye crystallization and inconsistency of the membrane thickness and the surface of recording layers when they are dissolved in the organic solvents, coated on substrates, and then dried; and are free of causing inconsistency of thickness and surface of the formed recording layers. The cyanine dyes of the present invention have also satisfactory solubility in non-halogen solvents, for example, alcohols such as methyl cellosolve, ethyl cellosolve, and diacetone alcohol; and ketones such as cyclohexanone. As the merit, the above alcohols scarcely damage the substrates or spoil the environment when used to dissolve the cyanine dyes of the present invention for coating onto the substrates.

Commercialized substrates can be used in the present invention, and usually the substrates used in the present invention can be processed with appropriate materials, for example, into discs, 12 cm in diameter and 0.6 mm or 1.2 mm in thickness, to fulfill the final use by the methods such as compression molding, injection molding, compression-injection molding, photopolymerization method (2P method), thermosetting integral method, and lightsetting integral method. The discs thus obtained can be used singularly or plurally after appropriately attaching them together with adhesives, adhesive sheets, etc. In principal, any materials for the substrates can be used in the present invention as long as they are substantially transparent and have a transmittance of at least 80%, preferably, at least 90% at a wavelength ranging from 400 nm to 800 nm. Examples 10 of such materials are glasses, ceramics, and others such as plastics including polyacrylate, poly(methyl methacrylate), polycarbonate, polycarbonate, polystyrene (styrene copolymer), polymethylpentene, polyester, polyolefin, polyimide, polyetherimide, polysulfone, polyethersulfone, polyarylate, polycarbonate/polystyrene alloy, 15 polyestercarbonate, polyphthalatecarbonate, polycarbonateacrylate, non-crystalline polyolefin, methacrylate copolymer, diallylcarbonatediethylene-glycol, epoxy resin, and phenol resin, among which polycarbonate is frequently used. In the case of plastic substrates, concaves for expressing synchronizing-signals and addresses of tracks and sectors are usually transferred to the internal circuit of the tracks during their formation. The form of concaves are not specifically restricted and preferably formed to give 0.3–0.8 μm in average wide and 70–200 nm in width.

Considering the viscosity, the light absorbents of the present invention are prepared into 0.5–5% (w/w) solutions in the above organic solvents, and then uniformly coated over the substrates to form a dried recording layer of 10–1,000 nm, and preferably 50–300 nm in thickness. Prior to the coating of the solutions, preliminary layers can be formed over the substrates to protect the substrates and improve the adhesion ability of the substrates, if necessary. Materials for the preliminary layers are, for example, high molecular substances such as ionomer resins, polyamide resins, vinyl resins, natural resins, silicon, and liquid rubbers. In the case of using binders, the following polymers can be used alone or in combination in a weight ratio of 0.01–10 times of the cyanine dye(s): Cellulose esters such as nitrocellulose, cellulose phosphate, cellulose sulfate, cellulose acetate, cellulose propionate, cellulose lactate, cellulose palmitate, and cellulose acetate/propionate; cellulose ethers such as methyl cellulose, ethyl cellulose, propyl cellulose, and butyl cellulose; vinyl resins such as polystyrene, poly(vinyl chloride), poly(vinyl acetate), poly(vinyl acetal), poly(vinyl butyral), poly(vinyl formal), poly(vinyl alcohol), and poly(vinyl pyrrolidone); copolymer resins such as styrene-butadiene copolymers, styrene-acrylonitrile copolymers, styrene-butadiene-acrylonitrile copolymers, vinyl chloride-vinyl acetate copolymers, and maleic anhydride copolymers; acrylic resins such as poly(methyl methacrylate), poly(methyl acrylate), polyacrylate, polymethacrylate, polyacrylamide, andpolyacrylonitrile; polyesters such as poly(ethylene terephthalate); and polyolefins such as polyethylene, chlorinated polyethylene, and polypropylene.

Explaining the method for using the optical recording media according to the present invention, the high density optical recording media such as DVD-Rs according to the present invention can write information at a relatively high density by using laser beams with wavelengths around 650 nm, particularly, 635–660 nm irradiated by semiconductor lasers such as those of AlGaInP, GaAsP, GaAlAs, InGaP, InGaAsP, and InGaAlP; or YAG lasers combined with second harmonic generation inducing elements (SHG elements). To read information, laser beams are used which have wavelengths identical to or slightly longer than those used for writing information. As for the laser power for writing and reading information, in the optical recording media of the present invention, it is preferably set to a relatively high level which exceeds the threshold of the energy required for forming pits when used for writing information, while it is preferably set to a relatively low level, i.e., a level below the threshold, when used for reading the recorded information, although the power levels vary depending on the types and ratios of other organic dye compounds and light resistant improvers which are used in combination with the cyanine dyes of the present invention: Generally, the power levels can be controlled to powers of at least 5 mW, usually, 10–50 mW for writing; and to powers of not higher than 5 mW, usually, 0.1–5 mW for reading. The recorded information is read out by detecting the change of the reflection light level or the transmission light level in the pits and the pit-less parts on the recorded surface of optical recording media. p Accordingly, in the optical recording media according to the present invention, minute pits, having a pit width of below 0.834 μm/pit at a track pitch of below 1.6 μm used commonly in the standard CD-R, can be formed stably at a relatively high density by using a light pickup of a laser beam with a wavelength around 650 nm, particularly, 635–660 nm. For example, in the case of using a substrate, 12 cm in diameter, one can prepare a high density optical recording medium having a recording capacity far exceeding 0.682 GB per one side and capable of recording information in the form of images and sound for about two hours, which the capacity could not be easily attained by conventional cyanine dyes.

Since the optical recording media of the present invention can record information in the form of characters, images, sound, and other digital data at a relatively high density, they are advantageously useful as recording media for professional and family use to record/backup/keep documents, data, and computer softwares. Particular examples of the kinds of industries and the forms of information, to which the optical recording media of the present invention can be applied, are as follows: Drawings of construction and engineering works, maps, ledgers of roads and rivers, aperture cards, architectural sketches, documents of disaster protection, wiring diagrams, arrangement plans, information from newspapers and magazines, local information, reports of construction works, etc., which all relate to architecture and civil construction; blueprints, ingredient tables, prescriptions, product specifications, product price tables, parts lists, maintenance information, case study files of accidents and problems, manuals for claims, production schemes, technical documents, sketches, details, company house-made product files, technical reports, analysis reports, etc., which all relate to manufacturing; customer information, correspondent information, company information, contracts, information from newspapers and magazines, business reports, reports of company credibility, records of stocks, etc., which all relate to sales; a company information, records of stocks, statistical documents, information from newspapers and magazines, contracts, customer lists, documents of application/notification/licenses/authorization, business reports, etc., which all relate to finance; information regarding properties, sketches of construction, maps, local information, information from newspapers and magazines, contracts of leases, company information, stock lists, traffic information, correspondent information, etc., which all relate to real property and transportations; diagrams of writings and piping arrangements, documents of disaster protection, tables of operation manuals, documents of investigations, technical reports, etc., which all relate to electric and gas supplies; patient files, files of patient clinical histories and case studies, diagrams of medical care/institution relationships, etc., which all relate to medical fields; texts, collections of questions, educational documents, statistical information, etc., which all relate to private and preparatory schools; scientific papers, records in academic societies, monthly reports of research, research data, documentary records and indexes thereof, etc., which all relate to universities, colleges, and research institutes; inspection data, literatures, patent publications, weather maps, analytical records of data, customer files, etc., which all relate to information; case studies on laws; membership lists, history notes, records of works/products, competition data, data of meetings/congresses, etc., which all relate to organizations/associations; sightseeing information, traffic information, etc., which all relate to sightseeing; indexes of homemade publications, information from newspapers and magazines, who's who files, sport records, telop files, scripts for broadcastings, etc., which all relate to mass communication and publishing; and maps, ledgers of roads and rivers, fingerprint files, resident cards, documents of application/notification/license/authorization, statistical documents, public documents, etc., which all relate to government offices. Particularly, the write-once type optical recording media of the present invention can be advantageously useful for storing records of patient files and official documents, which must not be deleted or rewritten intentionally, and also used as electronic libraries for art galleries, libraries, museums, broadcasting stations, etc.

As a rather specific use, the optical recording media of the present invention can be used to prepare and edit compact discs, digital video discs, laser discs, MDs (a mini disc as information recording system using photomagnetic disc), CDVs (a laser disc using compact disc), DATs (an information recording system using magnetic tape), CD-ROMs (a read-only memory using compact disc), DVD-ROMs (a read-only memory using digital video disc), DVD-RAMs (a writable and readable memory using digital video disc), digital photos, movies, video software, audio software, computer graphics, publishing products, broadcasting programs, commercial messages, game software, etc.; and used as external program recording means for large-sized computers and car navigation systems.

Hereinbefore, the use of the cyanine dyes of the present invention in the field of optical recording media has been mainly limited to high density optical recording media which use laser beams with wavelengths around 650 nm as a writing light. However, in the field of optical recording media, the cyanine dyes of the present invention can be advantageously used not only in high density optical recording media such as DVD-Rs but in commonly used optical recording media such as CD-Rs as materials for controlling and calibrating the absorptance and the reflectance, for example, by combining them with one or more other organic dye compounds sensitive to laser beams with wavelengths of 775–795 nm. Even in the case of applying to high density optical recording media which use laser beams with wavelengths around 650 nm as a writing light, pits can be indirectly formed, without directly forming pits on substrates using the cyanine dyes of the present invention, by combining with one or more other organic dye compounds sensitive to a longer wavelength light, for example, laser beams with wavelengths of 775–795 nm, in such a manner that an exited energy induced by laser beams with wavelengths around 650 nm is transferred through the cyanine dyes of the present invention to the organic dye compounds to decompose the compounds. The term "optical recording media" as referred to in the present invention means those in general which use the characteristic features of specific cyanine dyes that substantially absorb visible light with wavelengths around 650 nm, and includes, in addition to organic ablation-type optical recording media, for example, those prepared by the thermal coloration method which uses the chemical reaction between coloring agents and developers induced by the heat generated when the organic dye compounds absorb light, and those prepared by the technique called "moth-eye type technique" which uses the phenomenon that the above heat smoothes the pattern of periodical unevenness, provided on the surface of substrates.

The cyanine dyes of the present invention substantially absorb visible light with wavelengths around 650 nm, and therefore in addition to the use in the aforesaid optical recording media, the light absorbents comprising the cyanine dyes can be advantageously used as materials for polymerizing polymerizable compounds by exposure to visible light, sensitizing solar batteries, laser action substances in dye lasers, and dyeing clothes. If necessary, in combination with one or more other light absorbents capable of absorbing light in ultraviolet-, visible- and/or infrared-regions, the light absorbents of the present invention can be used in clothes in general and other materials including building/bedding/decorating products such as drapes, laces, casements, prints, venetian blinds, roll screens, shutters, shop curtains, blankets, thick bedquilts including comforters, peripheral materials for thick bedquilts, covers for thick bedquilts, cottons for thick bedquilts, bed sheets, Japanese cushions, pillows, pillow covers, cushions, mats, carpets, sleeping bags, tents, interior finishes for cars, and window glasses including car window glasses; sanitary and health goods such as paper diapers, diaper covers, eyeglasses, monocles, and lorgnettes; internal base sheets/linings/materials for shoes; wrappers; materials for umbrellas; parasols; stuffed toys; lighting devices; filters/panels/screens for information displaying devices such as televisions and personal computers which use cathode-ray tubes, liquid crystal displays, electroluminescent displays, and plasma displays; sunglasses; sunroofs; sun visors; PET (polyethylene terephthalate) bottles; storage; vinyl houses; lawns; optical fibers; prepaid cards; and windows of ovens including electric ovens. When used for wrapping, injecting, and enclosing the above articles, the light absorbents of the present invention advantageously prevent living bodies and products from problems and discomforts induced by environmental light such as natural and artificial light or minimize the above problems and discomforts, and they can advantageously regulate the color, tint, and appearance and adjust the light reflected from or passed through the articles to a desired color balance.

The following examples describe the preferred embodiments according to the present invention:

EXAMPLE 1

Cyanine Dyes

To a vessel were added 20 ml of acetonitrile and further added 10.0 g of 1-butyl-3,3-dimethyl-2-[(phenylamino)ethenyl]benzoindolium=p-toluenesulfonate, 7.6 g of 1,3-dimethyl-2-methylimidazoquinoxalium=p-toluenesulfonate, and two milliliters of acetic anhydride. Under stirring conditions at ambient temperature, to the mixture was dropped six milliliters of triethylamine, followed by stirring for two hours. The resulting crude crystals were filtered and dissolved by stirring in an adequate amount of methanol, followed by filtering the resulting solution. The filtrate thus obtained was admixed with an aqueous solution containing 3.0 g of sodium perchlorate, and the mixture was stirred for 30 min to effect ion exchange. Thereafter, the formed crystals were filtered, washed with methanol, and dried to obtain eight grams of a black crystal of the cyanine dye represented by Chemical Formula 10.

A portion of the black crystal was measured for melting point and revealed that it had a melting point of 301–302° C.

Although the production conditions and yields are varied to some extent depending on the structure of the cyanine dyes of the present invention, all the cyanine dyes including those represented by Formulae 1 to 27 can be yielded in a desired amount by the method in Example 1 or in accordance therewith.

EXAMPLE 2

Optical Property of Cyanine Dye

Figure 2:
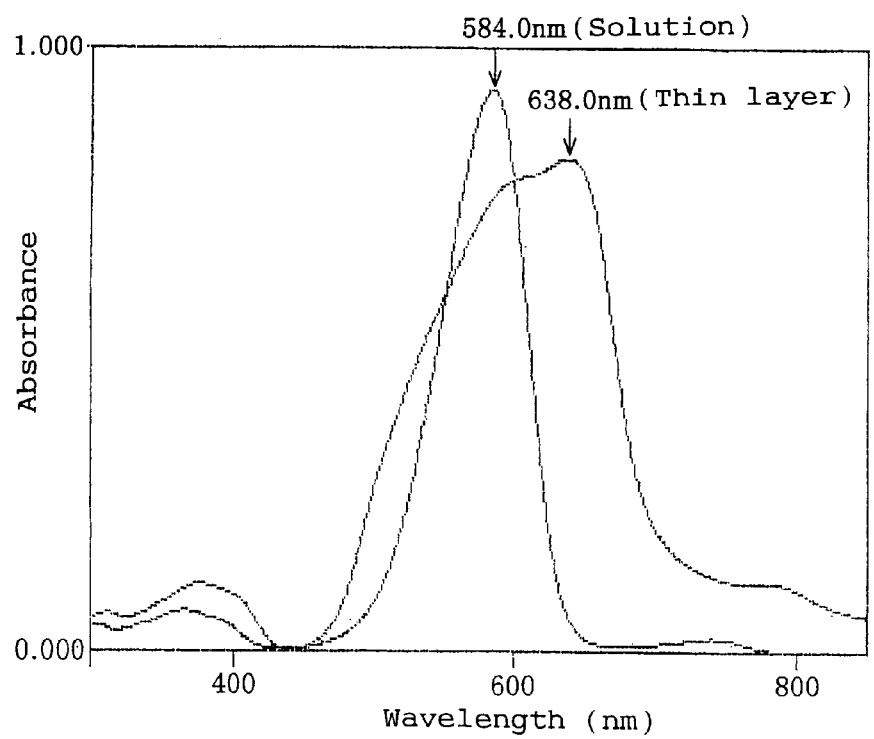
FIG. 2 shows the visible absorption spectra of another cyanine dye of the present invention when in a solution form and in a thin layer form.

The cyanine dyes in Table 1 were measured in a usual manner for visible absorption spectra in such a manner of dissolving them in methanol or allowing them to form layers on glass substrates to determine their absorption maxima when in solution and thin layer forms, respectively. The results are in Table 1. FIGS. 1 and 2 are visible absorption spectra for the cyanine dyes represented by Chemical Formulae 12 and 23, respectively.

TABLE 1

| Cyanine dye | Wavelength of absorption maximum (nm) Solution | Thin layer | Melting point (° C.) | Decomposition point (° C.) | Solubility (mg/ml) |
|---|---|---|---|---|---|
| Chemical Formula 4 | 583 | 632 | — | 324.3 | 4.9 |
| Chemical Formula 5 | 583 | 593 | 249.1 | 274.9 | 158.5 |
| Chemical Formula 6 | 582 | 614 | — | 313.0 | 70.0 |
| Chemical Formula 12 | 586 | 631 | — | 307.4 | 69.5 |
| Chemical Formula 16 | 588 | 600 | 252.1 | 292.8 | 93.2 |
| Chemical Formula 23 | 584 | 638 | — | 308.0 | 16.3 |
| Chemical Formula 24 | 592 | 653 | — | 292.0 | 9.1 |
| Chemical Formula 25 | 584 | 630 | — | 312.8 | 26.6 |
| Chemical Formula 27 | 592 | 637 | — | 298.5 | 68.3 |

Note: The symbol "—" means that it has a decomposition point undistinguishable from its melting point or only a decomposition point.

As evident from the results in Table 1, the cyanine dyes tested according to the present invention had absorption maxima at wavelengths around 580 nm when in a solution form and at wavelengths around 630 nm when in a thin layer form. As evident from the visible absorption spectra in FIGS. 1 and 2, the absorption ends at the longer wavelength of the cyanine dyes of the present invention extended up to a wave length around 700 nm. These results indicate that the cyanine dyes of the present invention have absorption maxima in a visible region and substantially absorb visible light with wavelengths around 650 nm when in a thin layer form.

EXAMPLE 3

Thermal Property of Cyanine Dye

Figure 3:
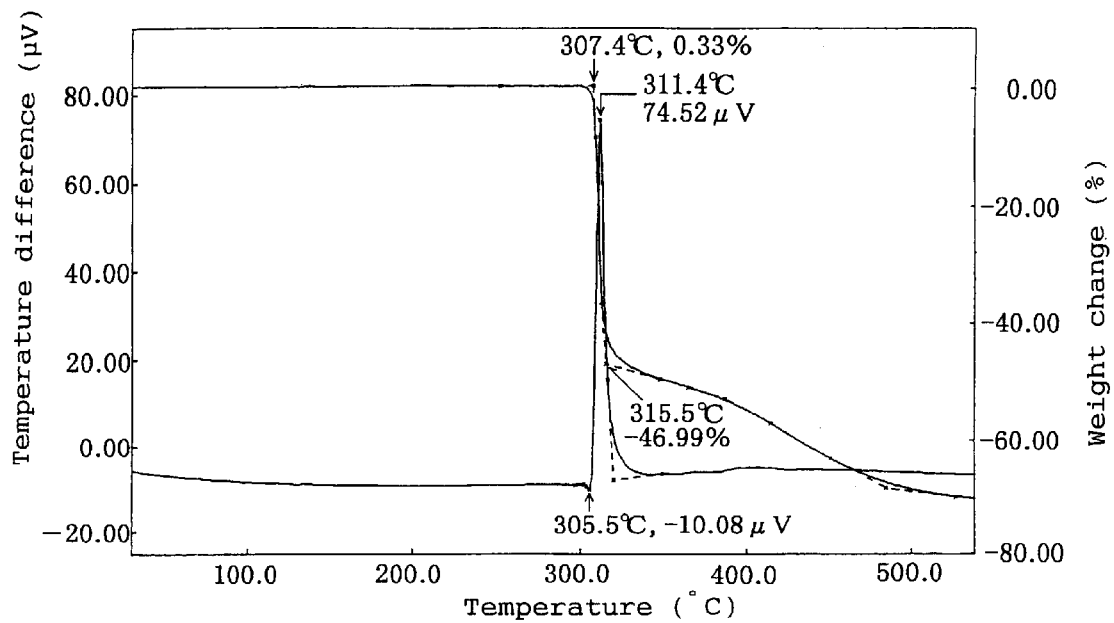
FIG. 3 shows the results of the DTA and TGA of one of the cyanine dyes of the present invention.
Figure 4:
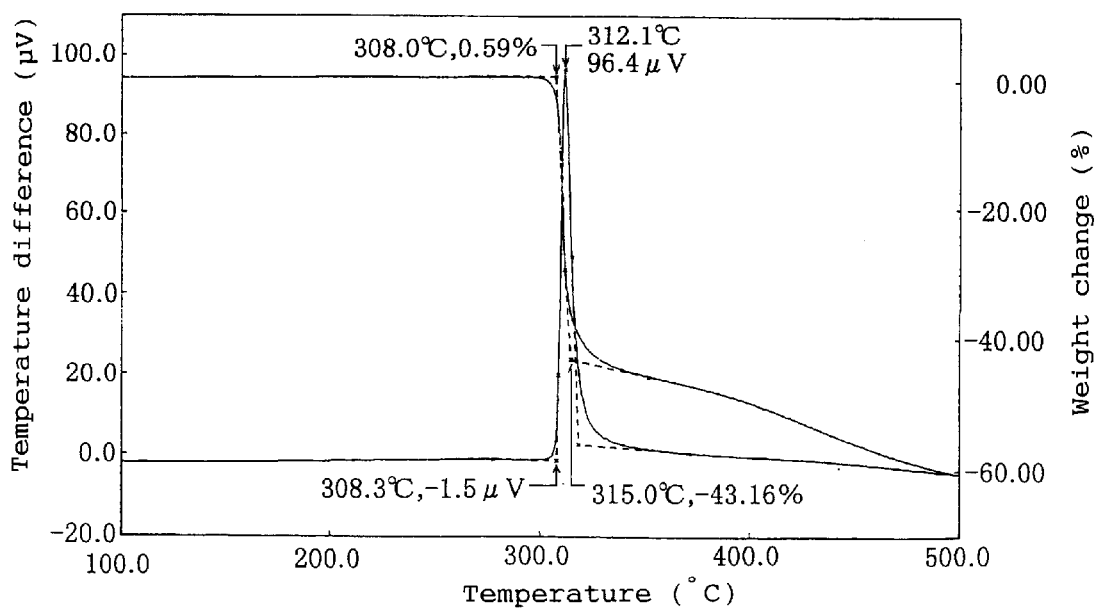
FIG. 4 shows the results of the DTA and TGA of another cyanine dyes of the present invention.

As a test specimen, an adequate amount of any one of the cyanine dyes in Table 1 was provided and subjected to conventional differential thermal analysis (hereinafter abbreviated as "DTA") and thermogravimetric analysis (hereinafter abbreviated as "TGA") using "MODEL TG/DTA 220", a digital thermo analyzer commercialized by Seiko Instruments Inc., Tokyo, Japan, to determine the decomposition point. The results are in Table 1. FIGS. 3 and 4 are respectively the results on DTA and TGA of the cyanine dyes of the present invention, represented by Chemical Formulae 12 and 23. In the TGA and DTA, the environmental temperature was set to an increasing temperature mode at a rate of 10° C./min.

As evident from the results in Table 1 and FIGS. 3 and 4, the cyanine dyes of the present invention have a decomposition point of over 270° C, preferably, 300° C. or higher, and have a relatively high thermal property. Most of the cyanine dyes tested had only decomposition points or decomposition points undistinguishable from their melting points, and promptly decomposed at around their decomposition points. As described above, when used in high density optical recording media such as DVD-Rs, loosely-decomposing organic dye compounds are difficult for forming minute pits on a restricted recording surface at a relatively high density. Varying depending on the glass transition temperature of substrates, when used as a light absorbent in optical recording media, dyes with lower decomposition points can be generally used to write information using relatively low power laser beams as an advantage, however, as a disadvantage, when exposed to laser beams for a relatively long period of time on reading, optical recording media processed with such dyes may easily accumulate heat and deform parts around pits and pitless parts on recording surfaces, resulting in undesirable jitters and reading errors. Most of the cyanine dyes of the present invention have only relatively high decomposition points or decomposition points undistinguishable from their melting points, and promptly decompose at their decomposition points. These characteristic features indicate that high density optical recording media, which have a relatively small jitter, insubstantial reading error, and satisfactory stability against exposure to environmental light such as reading and natural light, can be obtained by using the cyanine dyes of the present invention as light absorbents.

EXAMPLE 4

Optical Recording Media

Either of the cyanine dyes, represented by Chemical Formulae 12 and 23, as light absorbents, was added to TFP to give a concentration of 2.0% (w/w), and further admixed with, as a light resistant improver, the formazan metal complex represented by Chemical Formula 28, where the solid line drawn between the nickel atom and the nitrogen atom means a covalent bond and the dotted line means a coordinate bond, to give a concentration of 0.2% (w/w), followed by heating and ultrasonically dissolving the contents. According to a usual manner, the resulting solution was filtered with a membrane, and the filtrate was homogeneously coated on either surface of a polycarbonate disc substrate, 12 cm in diameter and 0.6 mm in thickness, which concaves, 0.74 μm in track pitch, 0.03 μm in wide, and 76 nm in width, for expressing synchronizing-signals and addresses of tracks and sectors had been transferred to the track's internal circuit, and dried to form a recording layer, 100 nm in thickness. Thereafter, the resulting substrate was deposited with gold to form a reflection layer, 100 nm in thickness, to be attached closely on the surface of the recording layer, and the reflection layer was homogeneously coated in a rotary manner with "DAICURE CLEAR SD1700", a known ultraviolet ray hardening resin commercialized by Dainippon Ink and Chemicals, Inc., Tokyo, Japan, and irradiated to form a protection layer to be attached closely on the surface of the reflection layer, followed by closely attaching on the protection layer a polycarbonate disc as aprotection substrate, 12cm in diameter and 0.6 mm in thickness, to obtain different types of optical recording media.

Chemical Formula 28:

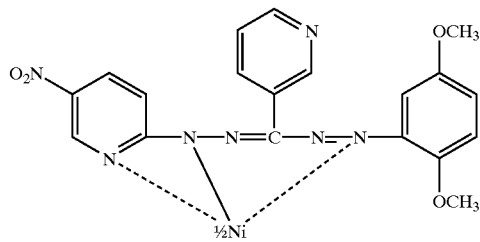

The optical recording media thus obtained have a recording capacity of over 4 GB and can record a large amount of information in the form of documents, images, sound, and other digital data at a relatively high density by using laser elements with an oscillation wavelength around 650 nm. Electron microscopic observation of the recorded surface of the optical recording media of this example, which had been written information by using a semiconductor laser element with an oscillation wavelength of 658 nm, revealed the formation of minute pits below 1 μm/pit at a track pitch of below 1 μm and at a relatively high density.

Industrial Applicability

As described above, the present invention was made based on the creation of novel trimethine cyanine dyes and their industrially useful properties. The cyanine dyes of the present invention have absorption maxima in a visible region and substantially absorb visible light with wavelengths around 650 nm when in a thin layer form, and have relatively high decomposition points and thermal resistance. Based on these properties, the cyanine dyes of the present invention have diversified uses in the fields of optical recording media, photochemical polymerization, solar batteries, dyeing, etc., which require organic dye compounds having the above properties, particularly, in the field of optical recording media, the cyanine dyes are outstandingly useful as light absorbents in high density optical recording media in which minute pits must be stably and promptly formed on a restricted recording surface at a relatively high density when in writing information, for example, when used particularly in DVD-Rs using laser beams with wavelengths of around 650 nm as a writing light.

As compared with the CD-Rs now used, the organic optical recording media of the present invention, which use the aforesaid light absorbents and write information using laser beams with wavelengths around 650 nm, can stably and promptly form minute pits at a relatively narrower track pitch and a relatively high density, and can record a vast amount of information in the form of characters, images, sound, and other digital data at a relatively high density, resulting in greatly lowering the cost for recording information per bit as a merit.

The cyanine dyes with such usefulness can be easily obtained in a desired amount by the process of the present invention which comprises either reacting a benzoindolium compound having a compatible leaving group with a pyrazinoimidazolium compound having a reactive methyl group; or reacting a benzoindolium compound having a reactive methyl group with a pyrazinoimidazolium compound having a compatible leaving group.

The present invention having these outstanding effects and functions is a significant invention that will greatly contribute to this art.

What is claimed is:

1. A trimethine cyanine dye represented by Formulae 1:

Formula 1:

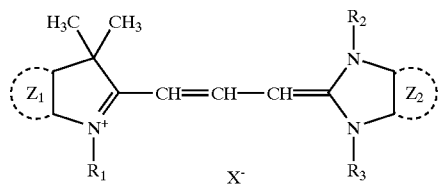

wherein in Formula 1, $R_1$, $R_2$ and $R_3$ are the same or different aliphatic hydrocarbon groups which are optionally substituted; $Z_1$ and $Z_2$ each represents a condensed naphthalene ring or a condensed quinoxaline ring for forming a benzoindolenine ring and a pyrazinoimidazole ring, respectively; and $X^-$ represents a compatible counter-ion.

2. The trimethine cyanine dye of claim 1, wherein X is an organic metal complex anion.

3. The trimethine cyanine dye of claim 1, wherein $X^-$ is an azo metal complex anion.

4. The trimethine cyanine dye of claim 1, which substantially absorbs a visible light with a wavelength of around 650 nm.

5. The trimethine cyanine dye of claim 1, which has only a decomposition point or a decomposition point undistinguishable from its melting point, said decomposition point being over 280° C.

6. A light absorbent comprising the trimethine cyanine dye of claim 1.

7. The light absorbent of claim 6, which comprises said trimethine cyanine dye and one or more other organic dye compounds sensitive to a visible light.

8. The light absorbent of claim 6, which comprises said trimethine cyanine dye and one or more compatible light resistant improvers.

9. The light absorbent of claim 6, which is sensitive to a laser beam with a wavelength around 650 nm when in a thin layer form.

10. An optical recording medium comprising the trimethine cyanine dye of claim 1.

11. The optical recording medium of claim 10, which has a recording layer comprising said trimethine cyanine dye and one or more other organic dye compounds sensitive to a visible light.

12. The optical recording medium of claim 10, which has a recording layer comprising said trimethine cyanine dye and one or more compatible light resistant improvers.

13. The optical recording medium of claim 10, which uses a laser beam with a wavelength around 650 nm as a writing light.

14. The optical recording medium of claim 10, which is used as an organic ablation-type optical recording medium.

15. A process for producing the trimethine cyanine dye of claim 1, which comprises a step of reacting a compound, represented by Formula 2 having $R_1$ and $Z_1$ corresponding to Formula 1, with a compound represented by Formula 3 having $R_2$, $R_3$ and $Z_2$ corresponding to Formula 1:

Formula 2:

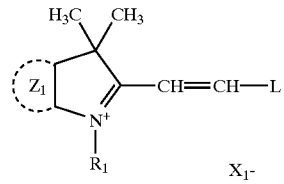

Formula 3:

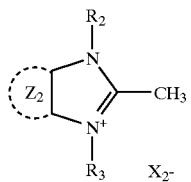

wherein in Formulae 2 and 3, $X_1^-$ and $X_2^-$ denote compatible counter-ions, and L denotes a compatible leaving group.

16. A process for producing the trimethine cyanine dye of claim 1, which comprises a step of reacting a compound, represented by Formula 4 having $R_1$ and $Z_1$ corresponding to Formula 1, with a compound represented by Formula 5 having $R_2$, $R_3$ and $Z_2$ corresponding to Formula 1:

Formula 4:

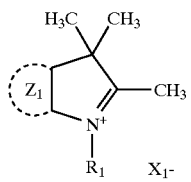

Formula 5:

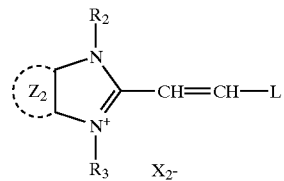

wherein in Formulae 4 and 5, $X_1^-$ and $X_2^-$ denote compatible counter-ions, and L denotes a compatible leaving group.

* * * * *